United States Patent [19]

Claus et al.

[11] Patent Number: 4,786,979
[45] Date of Patent: Nov. 22, 1988

[54] METHOD AND SYSTEM FOR PICTURE-CORRECT TRANSFER OF MOTION PICTURE FILM SCENES TO MAGNETIC TAPE

[75] Inventors: Holger Claus; Winfried Herbst, both of Weiterstadt, Fed. Rep. of Germany

[73] Assignee: Robert Bosch GmbH, Stuttgart, Fed. Rep. of Germany

[21] Appl. No.: 866,583

[22] Filed: May 22, 1986

[30] Foreign Application Priority Data

Jun. 7, 1985 [DE] Fed. Rep. of Germany ....... 3520333

[51] Int. Cl.$^4$ ............................................. H04N 5/782
[52] U.S. Cl. .................................... 358/335; 358/214; 358/346
[58] Field of Search ................. 358/54, 310, 312, 214, 358/215, 345, 346, 335; 360/11.1

[56] References Cited

U.S. PATENT DOCUMENTS 4,214,268  7/1980  Keznickl et al. ..................... 358/346
4,402,018  8/1983  Wada et al. ...................... 358/346 X
4,496,990  1/1985  Dyfverman ......................... 358/310

Primary Examiner—Robert L. Richardson
Attorney, Agent, or Firm—Frishauf, Holtz, Goodman & Woodward

[57] ABSTRACT

To record motion picture film scenes, for example recorded at 24 frames per second, a television recording medium, such as magnetic tape, in accordance with the NTSC standard of 30 frames—60 fields—per second, a sequence of pulses (FIG. 1: graph c) are generated, for example in a motion picture film scanner (3), which pulses have a frequency which is characteristic for the scanning repetion frequency at any film frame repetition rate—for exaple 24 frames per second; a motion picture film scanner (3) and a video recorder (5) are jointly controlled by the central process computer and controller to operate the video scanner to scan the film at the time when a selected frame of the film is before the scanner and, simultaneously and based on a sequence of generated pulses, controlling recording of the film on the record medium by the recording apparatus. A transfer switch may be used, connected to a monitor (11), to selectively display either the scanned scene or the recorded scene.

8 Claims, 3 Drawing Sheets

METHOD AND SYSTEM FOR PICTURE-CORRECT TRANSFER OF MOTION PICTURE FILM SCENES TO MAGNETIC TAPE

REFERENCE TO RELATED PUBLICATION

"SMPTE Journal" November 1981, pp. 1085–1089.

The present invention relates to transfer of scenes from a motion-picture film to a television record carrier, such as a video tape, in which accurate coordination of film scenes and video recording is obtained in spite of differences in frame repetition rates.

BACKGROUND

European television transmission standards provide for twenty-five frames, interlaced, per second. Each one of the frames is built up of two fields, interlaced with respect to each other, each one being scanned for the duration of 1/50 second. Each first field starts with line 1 of the TV standard scan and terminates for example in accordance with the CCIR standard, with line 312½. The CCIR standard provides 625 lines per frame. Each second field in the system starts with line 312½ and ends with line 625. Each field of each category is characterized by providing associated synchronizing signals. The necessary synchronism at any point of the overall transmission system is thereby insured. To maintain this synchronism, it is necessary that the alternating sequence of the first and second frame is retained, independently of the image or scene content.

Motion picture film is customarily recorded with a standard film speed of 24 images per second. Each image corresponds to a frame on the film. This film speed is retained also upon reproduction by motion picture projectors, so that the movement and course of scenes which were filmed is reproduced with precise time consistency. If motion picture films are to be reproduced on television operating according to the CCIR standard, or other standards which have 25 frames per second, it is possible to operate the film scanner slightly faster, so that the film in the scanner will run at a higher speed than 24 frames per second. This greatly simplifies the processing of the film in the scanner and in the recording instrument. The film speed coupled to the television system then will be 25 film frames per second. Each film frame is scanned twice, in order to obtain the requisite fields, with a different scanning track—to provide for the interlace; in accordance with some other apparatus, the film is scanned once and split electronically into the respective fields. The increased speed of reproduction, raised by the ratio of 25/24, results in slightly faster movement of moving events being reproduced; the increase is about 4%. In general, this is not noticeable to the viewer and is entirely tolerable. In this system, each television (TV) frame has the content of a motion picture frame and the transition from one film scene to a scene, for example from a different source, is accordingly possible after any one film frame. The associated audio cutting presents 25 possibilities per second for making a cut.

The situation becomes much more complicated when films, recorded at 24 frames per second, are to be reproduced in accordance with the NTSC standard, of 30 frames, that is, 60 fields per second. Increasing the film speed to 30 frames per second, or decreasing it to 15 frames per second, is not possible since the speed of movement portrayed, for example, on the film will become unrealistic. It has been proposed and has been in operation for many years to solve the problem by a 3/2 film feed in the film scanner.

In accordance with this prior art proposal, two sequential film frames are scanned in such a way that the first one is scanned three times and the second one is scanned twice. A third film frame is then again scanned three times and a fourth one twice. Each scanning is to obtain one TV field. The scanning of the first film frame of the sequence thus starts with the first field, continues with the second film field, and terminates with the endof the first field of the next TV frame. The next film frame is then scanned first with the scanning pattern of the second field and subsequently with that of the first field for the following third TV frame. The third film frame is again scanned three times in accordance with the TV standard, starting with the second field of the third TV full frame and terminating with the second field of the fourth TV full frame. The fourth film frame is scanned twice for the fifth TV frame. Consequently, after each four film frames, five TV frames will have been generated; with these four film frames and five TV frames, the sequence if terminated.

The ratio of four film frames to five TV frames corresponds exactly to the ratio of motion picture film speed to TV frame repetition rate (24:30). Similar conditions will result in film repetition rates which are a multiple or a fraction of standard speed of 24 frames per second.

Apparatus to scan motion picture images and to generate signals for recording the images on magnetic tape, in accordance with television standards, is usually referred to as telecine apparatus.

Problems arise due to the changing association between film frame and television scanned field when cutting, and particularly when cutting of video tape, is to be carried out. The publication "SMPTE Journal" November 1981, pp. 1085–1089, describes a system to generate a cutting list for TV treatment of films by magnetic tape, and which is concerned with the difficulties discussed above and suggests a solution. The known system requires transfer of a specific cutting code from the film scanner to the magnetic tape apparatus and recording thereof on the magnetic tape. This is a condition of proper operation. Recording does not comply with internationally set standards.

THE INVENTION

It is an object to provide a system and a method which permits ready association of any motion picture film scene with respect to a specific TV frame or field and which is applicable, preferably, to various film speeds, and not necessarily to a standard film speed of 24 frames per second, although this is the most widely and preferred application.

Briefly, a sequence of pulses are generated which have a frequency which is characteristics for the scanning repetition frequency at any film speed frame repetition rate; a video scanner and a video recorder are then controlled, in common and jointly, to operate the video scanner to scan the film at a time when a selected frame of the film is before the scanner, and, simultaneously and in relation to the sequence of pulses, controlling the recording of a field on tape, or other record medium.

The method and system has the advantage that transmission of a special cutting code to characterize the position of any film frame in relation to the TV scanning system is not needed.

DRAWINGS

FIG. 1, consisting of a-l, in a series of aligned graphs, is a timing diagram to illustrate the relationship between motion picture film speed and TV field and frame rates;

FIG. 2, consisting of a-d, illustrates how a predetermined cut can be carried out upon transfer from film to magnetic tape; and FIG. 3 is a block circuit diagram of a circuit arrangement or system to carry out the method of the present invention.

DETAILED DESCRIPTION

The temporal relationships between television scanning rates are shown in a system which has 30 TV frames per second repetition rate in relation to different motion picture film speeds, when a film image is to be transferred to a television record medium, for example magnetic tape. The frequency relations are of a basic nature. Graph c of FIG. 1 is a pulse sequence specific for a particular apparatus which has been built.

Figure 1:
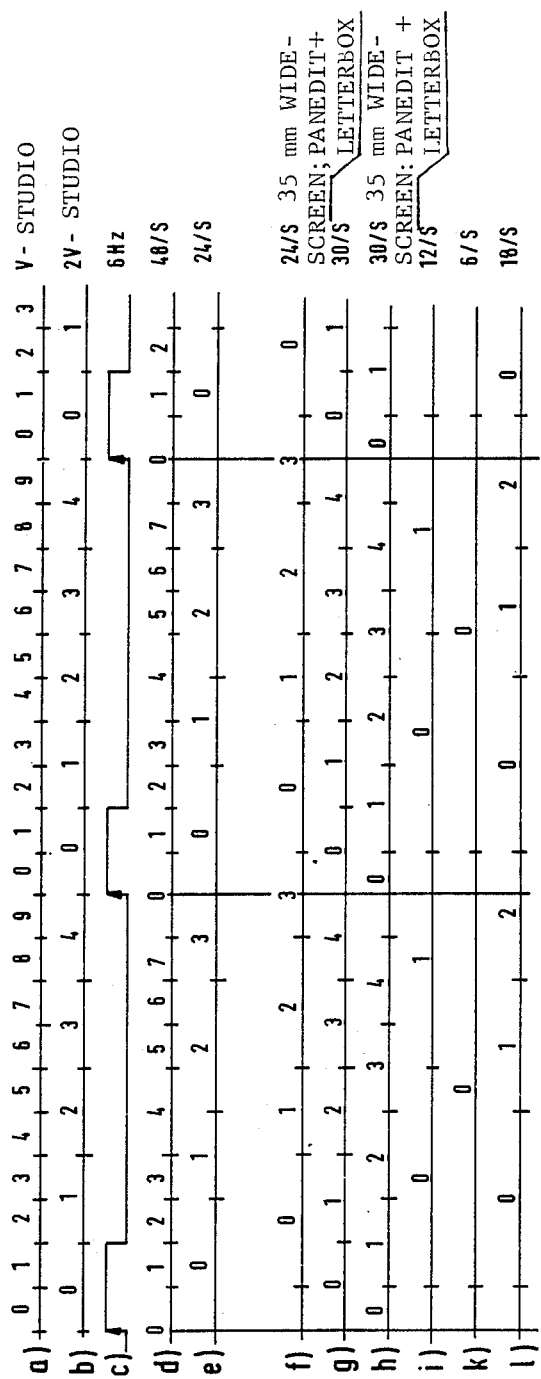

FIG. 1, graph a, schematically shows the sequence of vertical frequency (V) pulses which have a repetition rate of 60 Hz and characterize the beginning of any field. Graph b shows the correlated 2 V (vertical) frequency pulse sequence in which the pulses characterize the beginning of a frame, and which follow each other with a frequency of 30 Hz. These frequencies, V and 2 V, may be generated, for example, in a studio, as referred to in FIG. 1. In view of the above-described relationships between the TV scanning rate in a 60 Hz system and a motion picture film speed of 24 frames/second, and utilizing a 3/2 film feed, the frames indicated graphically by line b are combined in groups of five frames each. Each group starts with a frame 0 and ends with a frame 4. Correspondingly, the fields in line a of FIG. 1 are combined in groups of tens; each group, again, starts with a field 0 and ends with a field 9.

Graph c of FIG. 1 illustrates a pulse sequence for a specific apparatus, for example generated in a control apparatus—as will appear—in such a manner that the positive flanks occur simultaneously with the vertical pulses at the beginning of each full first frame, that is, at the beginning of each first field of a frame. This pulse sequence, in the example, will have a frequency of 6 Hz. The pulse repetition rate corresponds to the motion picture frame sequences shown in FIG. 1, graphs d and e, which repeat in the rhythm of ten video fields, as is clearly shown by the connecting lines in FIG. 1. This repetition rate is especially characterized by a 6 Hz signal—FIG. 1, graph c. The 6 Hz signal is generated in a telecine 3 (FIG. 3) which conducts the 6 Hz signal to a central process computer and controller 1. This 6 Hz signal of the telecine thus provides synchronization or coupling with the signals shown in graphs d to l in FIG. 1.

Graph d shows how reproduction is obtained when a film, operating at a speed of 48 frames per second should be reproduced in accordance with a 30 Hz TV standard, for example the NTSC standard. As can be readily seen, each fourth film frame is scanned twice. Consequently, eight film frames will extend over the same period of time as ten fields of the TV scan.

Graph e illustrates the relationship for a standard motion picture film speed of 24 frames per second. Each second film frame is scanned three times; the intermediate film frames are scanned twice. For four film frames, ten scans will occur. The relationship of 24 film frames: 60 scans will occur in the TV signal. Similarly, other film speeds can be handled; graphs f and l are illustrative of film speeds in which the film scan is non-uniform; the graphs g, h, i and k, corresponding, respectively, to 30, 30 and 6 film frames per second, to not require a "stutter" or "jerky" film feed since, in these instances, the frequency of the field (vertical) pulses is divisble by the film repetition frequency without a remainder.

The temporal relationship between the specific pulse sequence of the apparatus—graph c of FIG. 1—and the studio clock frequency, graphs a and b, shows that not any desired film frame can be recorded on any TV frame, selected at random; rather, a cut point from the film, transferred to the recording medium, e.g. a tape, is dependent on the weighting of association of field with the film frame as well as on the film speed and on the format. A selection must be made if reproducible cuts are to be obtained. The association of any film frame with a field can be calculated from the remainder of the division of the film counter by the periodicity or repetition rate which is determined by the speed and the format.

| scanned film speed, frames per second | field repetition rate |
| --- | --- |
| 48 | 8 |
| 30 | 5 |
| 24 | 4 |
| 18 | 3 |
| 12 | 2 |
| 6 | 1 |

The weighting or association of a frame on the recording medium, e.g. the tape, is derived from the remainder of the division of the time code frame value by 5, since the repetition rate of the film frames, in relation to the studio clock, is 10 TV fields.

EXAMPLE

Determination of a cut-over for film frame 5:37:18, of a magnetic tape recording apparatus, in which the film operates at 24 frames per second.

Standard format: Weighting of the film frame (with reference to the table) 18:4=4, remainder 2. The diagram shows the association of the image in the TV scan at 3, compare FIG. 1, graph e—24 frames per second, and graph b—30 frames per second. The cut, thus, is possible with respect to TV frames having the full frame number 3, 8, 13, 18, 23, 28 (i.e. 3, 3+5; 3+2×5, etc.).

Film speed 30 frames per second forms an exception, since the repetition rate of the film frames and of the TV screens are identical. Any randomly selected film frame can be completely recorded by any TV frame, in full, compare FIG. 1, graphs g and b.

Figure 2:
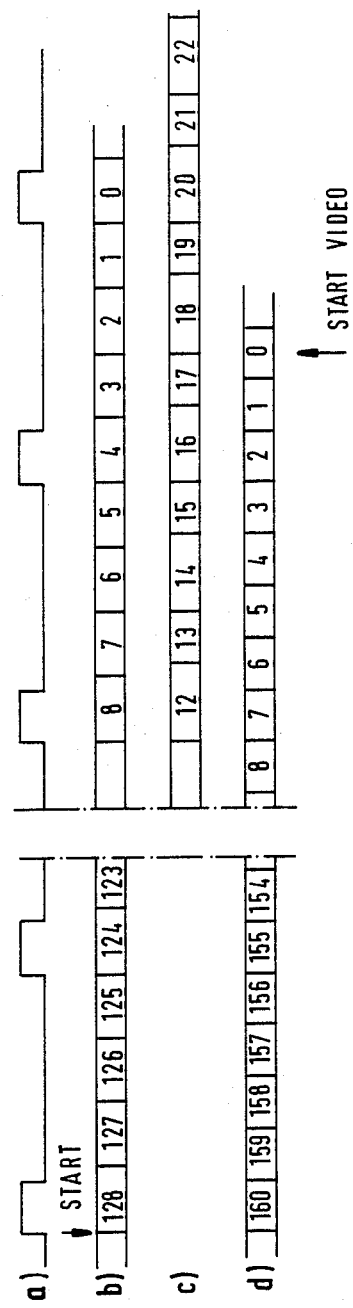

FIG. 2 illustrates the temporal relationship upon transfer of a scene from motion film to magnetic tape, utilizing a numerical example. To obtain a reproducible constant relationship between the state of a film counter and the pulse sequence frequencies in accordance with graph c of FIG. 1, generated in the film scanner or telecine 3, or apparatus associated therewith, the following is done:

(1) An interface receives a signal which is characteristic for the pulse sequence frequency of the pulses of graph c of FIG. 1; in the present example, this is a frequency of 6 Hz. Start commands are generated in synchronism with this signal, provided by a process controller of the film scanner and to the video magnetic tape apparatus; in other words, the respective reference clocks of the film scanner and the magnetic tape apparatus are started in synchronism.

(2) The reference clock of the film scanner is preset by the central controller or a central computer with a value which is divisible by 4 (four) without a remainder. This clock operates, continuously and constantly, at a rate of 24 frames per second.

(3) The film scanner receives, as values for a scene recording, that is, at the beginning of the transition of scanned film to video tape, a value which, at all times, is divisible by 4 without remainder. In accordance with the condition selected, the next higher value after the actual beginning of the scene is always selected. This feature is compensated again upon control of the video magnetic tape apparatus, in that the difference between actual and assumed beginning of the scene is added, with proper sign, to the reference time. Consequently, recording of the video magnetic tape apparatus will occur with the actual beginning of the scene.

EXAMPLE, WITH REFERENCE TO FIG. 2

Graph a of FIG. 2, again, reproduces the pulse sequence of graph c of FIG. 1, which characterizes the association of the film pull-down or feed frequencies corresponding to the respective film formats. The reference clock of the film scanner or telecine apparatus 3 (FIG. 3) and of a video magnetic tape recorder 5 (FIG. 3) are started by the control computer in synchronism with the 6 Hz signal. The process computer of the film scanner or telecine apparatus 3 calculates the run-on time, based on previously entered data, the scene transition, and the reference time of the instant for start of the machine. Similarly, the process computer, which is preferably a microcomputer, for the video magnetic tape apparatus calculates the starting time instant in accordance with graph of FIG. 2 based on the values for the reference time and for the start of recording, as well as for the specific run-on or acceleration time of the machine in question. The run-on time is known and entered in form of data into the process microcomputer. Synchronism with the 6 Hz signal (FIG. 2, graph a) is thus obtained, since all the machine delays are known. A predetermined number, e.g. 128 (FIG. 2, graph b), can be entered in the film scanner or telecine 3 by the reference clock (FIG. 1, graph a), thereby ensuring synchronism with the 6 Hz signal.

An overall control computer or central computer stage 1 (FIG. 3), and coordinating data from both the video film transport mechanism and the magnetic tape mechanism, then establishes the relationship between the reference clock of the film scanner—see graph b of FIG. 2—and of the video magnetic tape recording apparatus—see graph d of FIG. 2. The central computer element 1 receives data and considers the previously discussed periodically occurring relationships between film transport and magnetic tape counter of the video magnetic tape apparatus. In the present example, the reference clock of the film scanner is started at a value of 128, and counts downwardly, that is, runs backwardly, to a value of 0. The film scanner is started, as seen in graph c of FIG. 2, to provide for run-on of the film, under control of the process computer associated with the film scanner. Starting is done at a time sufficiently early so that several film frames will be properly recorded on the magnetic tape recorder in the light of the temporal relationships shown in FIG. 1, to insure uniformity and constancy of synchronism. In the present example, recording should start with the beginning of frame number 18. Due to the association of the pulse sequence, see graph a of FIG. 2, the reference clock continues to run to frame 20, the assumed beginning of the scene to be recorded on the tape, that is, the assumed cut-on point. The control computer determines the difference between frame number 20 and frame number 18 on the film and reduces the reference period for the magnetic tape—see graph d of FIG. 2—to the extent that the clock, which also counts down to value 0, will reach value 0 with frame 18, and, at that point, causes or controls start of recording from the film on the tape. This is schematically indicated in FIG. 2 by the arrow "start video" at frame 0 for the magnetic tape recorder; and starting of running of the film by the arrow "start" in graph b.

Figure 3:
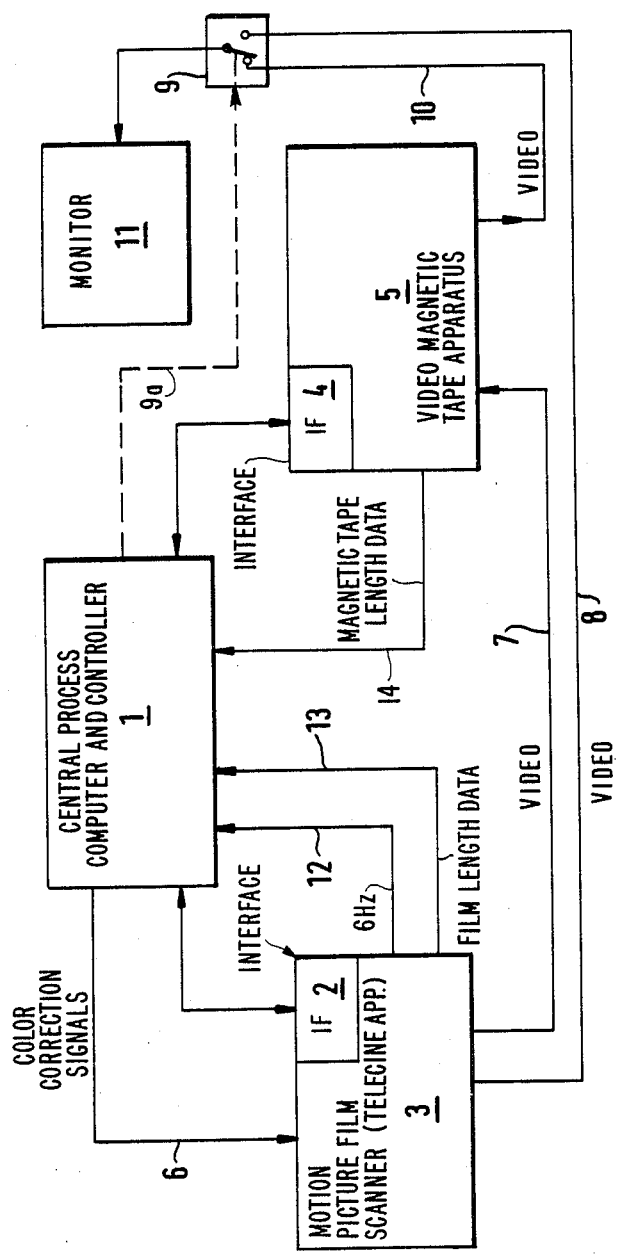

The apparatus to carry out the method is shown, schematically, in FIG. 3.

A central process computer and controller 1, which may be part of a much more substantial apparatus, for example apparatus for recording film scenes on tape including color correction and the like, is connected via a first interface 2 to a motion film scanner 3. The central process computer and controller 1, further, is connected via a second interface 4 to the magnetic tape apparatus 5.

A plurality of connection lines 6, and representative of a group of lines, is provided to apply to the film scanner or telecine 3 color correction signals which, for example can be generated by the central process computer and controller 1 in accordance with any well known and suitable arrangement. Color correction does not form part of the present invention and is mentioned only in this connection since the central process computer and controller 1, besides controlling the cut-over of scenes from film to tape, can have numerous other control and computing functions. Line 6 and color correction are, therefore, referred to only for completeness' sake.

The film scanner 3 is connected by a video line 7 to the video magnetic tape apparatus 5, to transfer video signals from the scanner 3 to the tape apparatus 5. The film scanner 3 is, further, connected to a transfer terminal of a transfer switch 9. Video signals from the video magnetic tape apparatus 5 are connected via line 10 to a second transfer terminal of switch 9. Unit 11 is a monitor, to permit supervision of the operation of the system. Transfer switch 9 is controlled from the central process computer and controller, as shown by the broken line 9a in FIG. 3. The intended scene transition from film to magnetic tape can be simulated and the actual transition can be checked and made visible on the monitor.

A line 12 is provided on which the 6 Hz pulses—see FIG. 1, graph c, and FIG. 2, graph a—are applied from the central process computer and controller 1, where they are generated, to the motion picture film scanner 3. Line 13 connects digitally coded data from the scanner 3 to the central processor 1; they provide data and information regarding the state of the film length counter. Tape length counter signals, generated in the magnetic tape apparatus 5 can, of course, likewise be connected to the central portion computer and controller 1 over suitable connection lines, as well known. Only one such connection line 14, representative thereof is shown.

As can be seen from FIG. 3, the central process computer 1 jointly and commonly controls operation of the telecine 3 and of the tape apparatus 5.

Data regarding run-on time—see discussion in connection with FIG. 2—can be entered in the central process computer, for example by suitable settings, or programming of read-only memories (ROMs) or similar data storage.

Similar interrelations as described above exist in connection with other television standards than NTSC, e.g. PAL, at recording motion picture film scenes in this particular television system with fixed film frame repetition rates. In the PAL example, the lowest common denominator is 2½ cps for the film frame repetition rate of 6¼ and 16⅔ ps.

WIDESCREEN (in German: Breitwand), PAN EDIT'Letterbox are playback-formats of the film scanner FDL60 for the playback of 35 mm-CINEMASCOPE-films.

WIDESCREEN: proportion of picture sides is 1.85:1. The picture is expanded so that there are no blanked areas above and below the picture.

LETTERBOX: Proportion of picture sides is 2.21:1, but blanked areas above and below the picture.

PAN EDIT-LETTERBOX: LETTERBOX-format with two vertical lines to define a picture section which can be expanded over the whole screen (so-called PAN SCAN-procedure).

What is claimed is:

1. Method for recording motion picture film frames representing scenes on television recording tape, utilizing a telecine forming a motion picture video scanner (3), a video tape recording apparatus (5) to record video scenes in accordance with television transmission standards operating at 60 fields per second, and a central process computer (1);

comprising
generating a sequence of pulses (FIG. 1: graph c) in the telecine which have a frequency which is characteristic for the scanning repetition frequency at all occurring motion picture film speeds and which corresponds to the lowest common denominator of the frame repetition frequency of the motion picture film speed and the field repetition frequency of the video standard, respectively,
transferring said pulses to the central process computer (1); and
jointly controlling by said process computer (1), the telecine (3) with respect to the video tape recording apparatus (5) to operate the video scanner (3) to scan a selected frame of the film at a time when the selected frame of the film is before the scanner and, simultaneously and based on the generated sequence of pulses, controlling recording on the recording tape by the video tape recording apparatus (5).

2. The method of claim 1, wherein said frequency of pulses is 6 Hz.

3. System for picture-correct transfer of motion picture film scenes on a television recording tape in a television system operating at 60 fields per sercond comprising
a central process computer and common controller (1);
a telecine forming a motion picture film scanner (3);
a video tape recording apparatus (5);
a machine control interface (2) coupled to the telecine (3) and a second machine control interface (4) coupled to the video magnetic tape recording apparatus (5);
means (7) coupling the telecine (3) to the video tape recording apparatus (5) for transmission of video signals from the telecine to the video tape recording apparatus (5);
said telecine generating a sequence of pulses (FIG. 1: graph c) which have a frequency which is characteristic for the scanning repetition frequency at all occurring film speeds;
means (12) for transmitting the generated sequence of pulses from the telecine to the central process computer and common controller (a); and
connection means from the central process computer and controller (1) both to the telecine (3) and the video tape recording apparatus (5), with the respective machine control interface (2) interposed, to control operation of the telecine (3) to scan the film at a time when a selected frame of the film is before a scanner of the telecine and, simultaneously, and based on said generated sequence of pulses, controlling operation of said video tape recording apparatus (5) to record information on the recording tape.

4. System according to claim 3, further including a transfer switch (9) having a common terminal;
a monitor (11) coupled to the common terminal;
circuit means (8, 10) connecting video signals from the telecine (3) to a first transfer terminal of the transfer switch (9) and, respectively, from the telecine to a second transfer terminal of the transfer switch;
and a control connection (9a) controlling selective operation of the transfer switch from the central process computer and controller to provide for display of video frames on the monitor, selectively and alternately, as derived from the telecine or the video tape recording apparatus (5) to permit monitoring simulated and actual scanned signals.

5. The system of claim 3, wherein said sequence of pulses is 6 Hz.

6. Method for the picture-correct transfer of motion picture film scenes to magnetic tape, utilizing a telecine (3) and a video tape recorder (5) to record film scenes in accordance with television transmission standards operating at 60 fields per second,
comprising
generating a sequence of pulses (FIG. 1: graph c) in the telecine which have a frequency which is characteristic for the scanning repetition frequency at all occurring film speeds;
transferring the sequence of pulses from the telecine (3) to a common control means (1); and
controlling, by the common control means (1), the telecine (3) relative to the video tape recorder (5), based on said sequence of pulses, in such a way that the relative position of the film picture selected for the transfer, as related to the pulse sequence (FIG. 1: graph c) is such that the field calculated based on said sequence, and on the film, will be recorded on the magnetic tape in accordance with television transmission standards.

7. The method of claim 6, wherein the sequence of pulses has a frequency corresponding to the lowest common denominator of the frame repetition frequency of the motion picture film speed and the field repetition frequency of the video standard, respectively.

8. The method of claim 6, wherein said sequence of pulses is 6 Hz.

* * * * *